Figure 1:
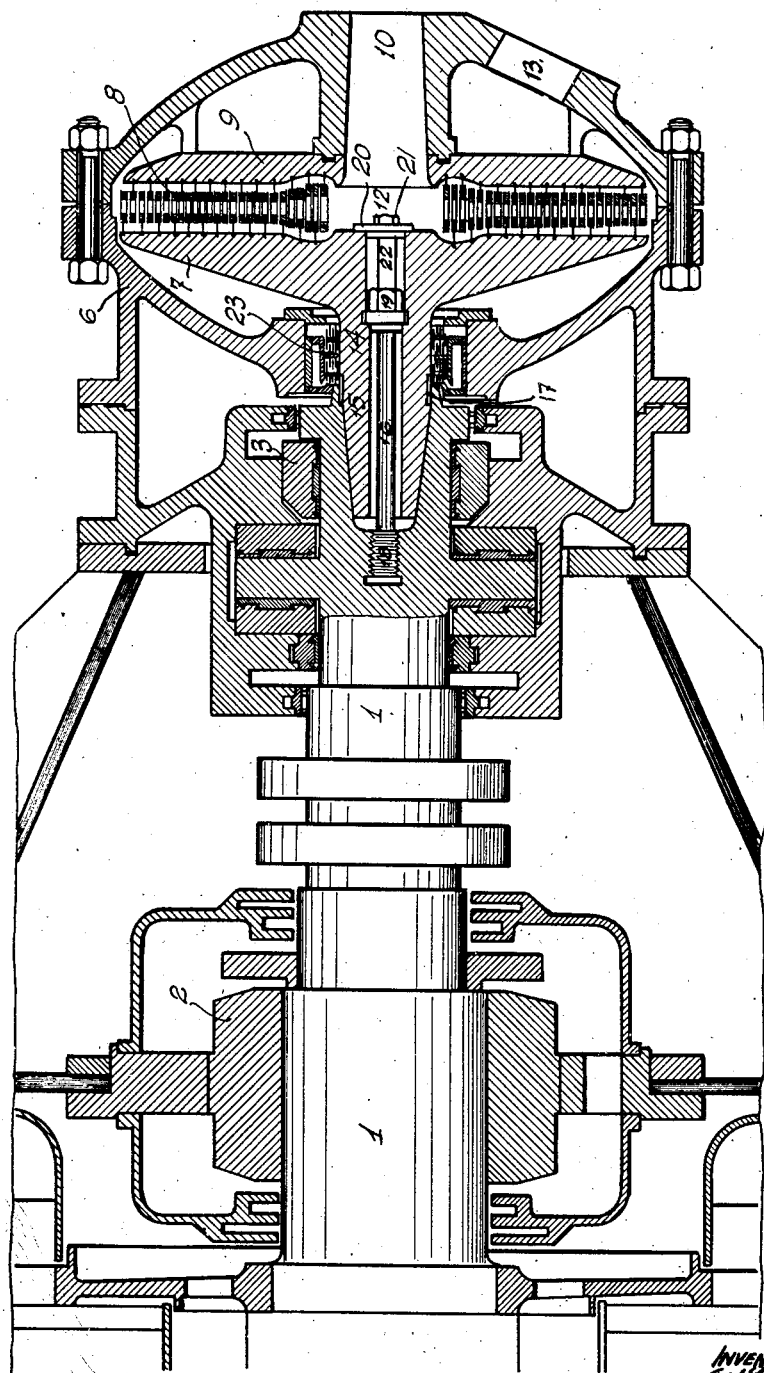

Dec. 20, 1932.    A. LYSHOLM    1,891,718
SHAFT FOR OVERHUNG ELASTIC FLUID TURBINES
Filed July 3, 1930    2 Sheets-Sheet 1

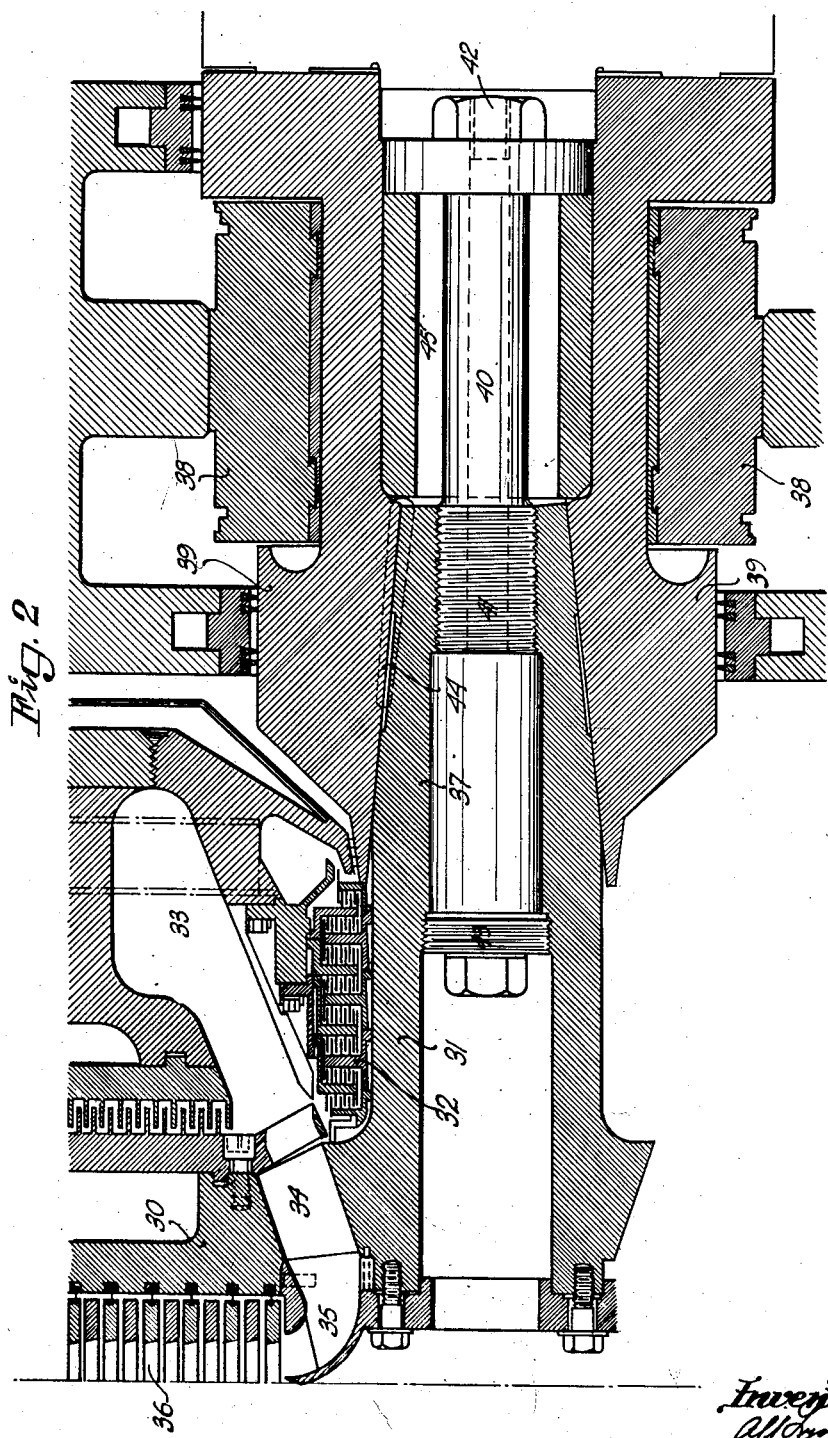

Patented Dec. 20, 1932

1,891,718

UNITED STATES PATENT OFFICE

ALF LYSHOLM, OF STOCKHOLM, SWEDEN, ASSIGNOR TO AKTIEBOLAGET LJUNGSTROMS ANGTURBIN, OF STOCKHOLM, SWEDEN, A JOINT-STOCK COMPANY OF SWEDEN

SHAFT FOR OVERHUNG ELASTIC FLUID TURBINES

Application filed July 3, 1930, Serial No. 465,507, and in Germany February 5, 1930.

The present invention relates to elastic fluid turbines having turbine wheels which are overhung on the turbine shaft. In many forms of turbines of this general type, the turbine shaft is built up of independent parts which are secured together by means of one or more bolts at or adjacent to the axis of the shaft, which bolts serve to maintain a conical or like connection between the shaft parts. In previous forms of construction such connections have been situated close to the turbine disc that the overhung extending end of the journaled shaft provides the connection between the turbine disc and the journaled portion of the shaft. In such constructions it has been found, particularly in turbines operating at high temperatures, that the connection between the turbine shaft and the turbine disc seizes due to such high temperatures so that the connection cannot be broken for the purpose of disassembling the turbine, after the turbine has been in service for any material length of time. This difficulty is particularly true in turbines of the radial flow type, since a shaft connection close to the turbine disc is necessarily located either in or at the line of the wall of the channel which conducts the high temperature live steam to the blade system of the turbine. In such constructions where the shaft connection is placed on the turbine side of the shaft stuffing box, the connection operates at a temperature substantially the same as the temperature of the motive fluid and such temperature is sufficient to practically invariably cause such seizing of the connection as to prevent disassembly of the shaft.

The present invention has for its principal object the provision of an improved form of turbine shaft construction which will eliminate the difficulties heretofore encountered with such shafts. A further object of the invention is to provide an improved shaft construction of the character described in which the shaft connection is not only so located as to prevent seizing thereof due to high temperatures but which also permits easy disassembly of the turbine parts including the shaft stuffing box.

The nature of the invention and the advantages to be derived from its use may best be understood from a consideration of the following description of preferred embodiments of apparatus for carrying the invention into effect.

In the accompanying drawings forming a part of this specification,

Fig. 1 is a longitudinal central section through a part of a turbine set embodying the invention, the turbine being of the single rotation radial flow type; and, Fig. 2 is a similar section of a small part of a radial flow turbine of another type which embodies the invention.

Referring to Fig. 1, 1 designates a shaft journalled in bearings 2 and 3, the shaft in this case supporting the rotor of an electrical generator surrounded by a housing. This shaft, which may cooperate with any other apparatus or may support such an apparatus, is driven by means of a turbine accommodated in the casing 6. This turbine is arranged in relation to the shaft 1 in such a manner that the shaft 1 also constitutes a part of the turbine shaft. The turbine shown in Fig. 1 is a radial flow turbine of the single rotation type, a turbine disk 7 being securely fastened to the turbine shaft 1 and supporting a blade system 8, the blades of which are inserted between rings of guide blades attached to the non-rotating turbine disk 9. The driving medium (steam or gas) flows through a conduit 10 from a throttle valve or the like, not shown on the drawings, to the center 12 of the turbine and passes in radial direction through the blade system to the space or chamber within the turbine casing, from which space the steam is discharged through the outlet 13. In the present case, the turbine disk 7 is made integral with a hub or stub shaft 14 which is united with the journalled turbine shaft 1. Stub shaft 14 and shaft 1 may be considered as shaft parts which together provide the turbine shaft. This connection which may be of any conventional type is in this embodiment made with the stub shaft 14 conically reduced as to its diameter in the direction towards the journalled shaft 1 in such a manner that the conical end 15 of the stub tenon 14 fits into a corresponding recess in the journalled shaft 1. The conical surfaces produced in this manner are pressed against each other by means of bolt 16 to effect a connection between the two shaft parts which prevents the shaft parts from moving axially with respect to each other. Relative rotation between the parts of the shaft which contact at 17 is prevented by providing such parts with cooperating serrated or recessed surfaces. Bolt 16 is screwed into shaft 1 at 18 and is adapted to be tightened or loosened by turning the bolt head 19. In order to prevent steam from reaching the bolt and the parts forming the connection, the bolt head 19 is located in a recess in the stub shaft 14 and this recess is closed by a closure member 20 held in position by a bolt 22 having a head 21. Bolt 22 may conveniently be screwed into a suitable socket in the bolt head 19. While in the form shown, the shaft parts are held in assembled relation by means of a single centrally located bolt 16, it will be evident that with shafts of large diameter a plurality of bolts disposed in the usual bolt circle may be employed.

In the present embodiment the turbine disc 7 and the hub or stub shaft 14 are made integral but obviously these parts may be made separately and connected in any suitable manner. In such case, however, there is the probability that the connection between the turbine disc and the stub shaft which would be in a high temperature zone would seize. This, however is not of material moment since it would not prevent disassembly of the turbine, as the connection comprising the conical end 15 of the stub shaft 14 and the socket in the journaled shaft 1 would be located at such a distance from the high temperature steam that this latter connection could always be readily loosened to permit removal of the turbine disc and the stub shaft.

In Fig. 2 is shown an embodiment according to the invention in connection with radial flow turbines of the double rotation type, in which the rotating blade supporting turbine disk 30 is provided with a stub shaft 31. Surrounding the stub shaft is an annular stuffing box 32 which prevents the steam, which flows through the channel 33 and passages 34 in the turbine disk 30 to the center 35 of the turbine and then passes through the blade system 36, from leaking out about the turbine shaft. The stub shaft 31 is conical and its diameter diminishes toward its end 37. It is fitted into a recess in a shaft 39 journalled in the bearing 38. This conical connection is maintained by a bolt 40 which is screwed, by means of threads 41, into the stub shaft 31. The bolt is turned by means of the bolt head 42, whereby the shaft parts are pressed against each other. In order to secure this connection to such an extent that the conical surfaces cannot move rotationally with respect to each other, a number of pins or keys 44 are inserted in suitable key ways in the conical surfaces contacting each other. These pins or keys are kept in their places by means of a sleeve 45 which at one end abuts against the protruding ends of the pins or keys 44. Sleeve 45 is held in position by a suitable collar or bolt 40. The stub shaft 31 is hollow but its interior is closed close to the bolt 40 by means of a plug 43 screwed into the stub shaft 31. By this means the bolt 40 and also the conical surfaces and thus the whole connecting device are disposed at a greater distance from the steam channels 33, 34 and 35 and may therefore be kept at such low temperature that danger of seizing fast is not present. In this embodiment, as in the one illustrated in Fig. 1, the turbine shaft may be considered as comprising two shaft parts joined together, one of the shaft parts being the stub shaft rigid with the blade carrying part of the turbine rotor member.

In the two embodiments above referred to, the stub shaft has a conically tapered part which is fitted into a recess in the journalled shaft. The connection, therefore, has a smaller diameter than the stuffing box which as a result may be removed after loosening the connection between the shaft journal and the journaled shaft by drawing it over the conically tapered end of the stub shaft. It is thus evident that the invention is particularly suitable for turbine constructions in which the stuffing box is not axially divided.

In the embodiments above described, the invention is shown as applied to radial flow turbines of both single and double rotation type, and it will be readily understood that the invention may be embodied in other types of turbines having overhung turbine discs.

It will be evident to those skilled in the art that the specific form of the structure employed may be varied within the scope of the invention as defined by the appended claims.

What I claim is:

1. In a radial flow elastic fluid turbine, means providing a steam chamber, a turbine member comprising a blade-carrying disc in said chamber and a stub shaft rigidly connected with said disc, there being an axial bore through said member, said stub shaft having a conically tapered end portion and a cylindrical portion between the end portion and the disc, said cylindrical portion having a diameter at least as great as that of the end portion, a stuffing box around said cylindrical portion, a journaled shaft for carrying said member in overhung relation, said journaled shaft having a conical socket receiving the tapered end of the stub shaft, bolt means seating in said bore and extending therethrough into said journaled shaft for securing said shafts together and means providing a closure for said bore between said bolt means and said chamber.

2. In a radial flow elastic fluid turbine, means providing a steam chamber, a turbine member comprising a blade-carrying disc in said chamber and a stub shaft rigidly connected with said disc, said member having a differential bore extending axially therethrough, the portion of larger diameter of the bore extending toward said chamber, said stub shaft having a conically tapered end portion and a cylindrical portion between the end portion and the disc, said cylindrical portion having a diameter at least as great as that of the end portion, a stuffing box around said cylindrical portion, a journaled shaft for carrying said member in overhung relation, said journaled shaft having a conical socket receiving the tapered end of the stub shaft, a bolt seating in said differential bore and extending through the portion thereof of smaller diameter into said journaled shaft to secure said shafts together and means for closing the portion of said bore between said bolt and said chamber.

3. In an elastic fluid turbine, means providing a steam chamber, a stuffing box, a shaft part journaled outside of said chamber, a turbine member comprising a blade-carrying part overhung in said chamber and a shaft part rigid with the blade-carrying part and projecting from the chamber through the stuffing box, said shaft parts being joined outside the chamber and the projecting portion of the second mentioned shaft part having a maximum diameter not greater than the internal diameter of the stuffing box.

4. In an elastic fluid turbine, means providing a steam chamber, a stuffing box, a shaft part journaled outside of said chamber, a turbine member comprising a blade-carrying part overhung in said chamber and a shaft part rigid with the blade-carrying part and projecting from the chamber through the stuffing box, said shaft parts having cooperating surfaces providing an axially tapered joint situated outside of the chamber and the projecting portion of the second mentioned shaft part having maximum diameter not greater than the internal diameter of the stuffing box.

5. In an elastic fluid turbine, means providing a steam chamber, a stuffing box, a shaft part journaled outside of said chamber, a turbine member comprising a blade-carrying part overhung in said chamber and a shaft part rigid with the blade-carrying part and projecting from the chamber through the stuffing box, the projecting portion of the second mentioned shaft part having a maximum diameter less than the internal diameter of the stuffing box, one of said shaft parts having an axially tapered conical socket and the other of said shaft parts having a portion of complementary shape seated in said socket and bolt means for holding said shaft parts together.

6. In an elastic fluid turbine, means providing a steam chamber, a stuffing box, a shaft part journaled outside of said chamber, a turbine member comprising a blade-carrying part overhung in said chamber and a shaft part rigid with the blade-carrying part and projecting from the chamber through the stuffing box, the projecting portion of the second mentioned shaft part having maximum diameter less than the internal diameter of the stuffing box, one of said shaft parts having an axially tapered conical socket and the other of said shaft parts having a portion of complementary shape seated in said socket, and bolt means protected from contact with steam admitted to said chamber for holding said shaft parts together.

7. In an elastic fluid turbine, means providing a steam chamber, a stuffing box, a turbine member comprising a blade-carrying part overhung in said chamber and a shaft part rigid with the blade-carrying part and projecting from the chamber through the stuffing box, said shaft part comprising a conically tapered end portion and a cylindrical portion intermediate the conical portion and the blade-carrying part of the turbine member, said cylindrical portion being positioned within said stuffing box and having a diameter at least as great as that of said end portion, a shaft part journaled outside of said chamber, said last mentioned shaft part having a conical socket in one end receiving the tapered end portion of the first mentioned shaft part, and bolt means for securing said shafts together.

In testimony whereof I have hereunto affixed my signature.

ALF LYSHOLM.